(12) United States Patent
Yamashita et al.

(10) Patent No.: US 10,061,067 B2
(45) Date of Patent: Aug. 28, 2018

(54) POLARIZING PLATE AND METHOD FOR MANUFACTURING POLARIZING PLATE

(71) Applicant: NITTO DENKO CORPORATION, Ibaraki-shi, Osaka (JP)

(72) Inventors: Tomohiro Yamashita, Ibaraki (JP); Mie Nakata, Ibaraki (JP); Shunsuke Murayama, Ibaraki (JP); Makiko Kimura, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 15/187,387

(22) Filed: Jun. 20, 2016

(65) Prior Publication Data

US 2016/0370525 A1    Dec. 22, 2016

(30) Foreign Application Priority Data

Jun. 22, 2015    (JP) .................................. 2015-124799

(51) Int. Cl.
*G02B 5/30* (2006.01)
*G02F 1/13363* (2006.01)
*G02B 1/14* (2015.01)
*G02B 1/11* (2015.01)

(52) U.S. Cl.
CPC .............. *G02B 5/3083* (2013.01); *G02B 1/11* (2013.01); *G02B 1/14* (2015.01); *G02F 1/13363* (2013.01)

(58) Field of Classification Search
CPC ................................ G02B 1/14; G02B 5/3083
USPC ........................................ 359/489.01–489.07
See application file for complete search history.

(56) References Cited

U.S. PATENT DOCUMENTS

| | | | | |
|---|---|---|---|---|
| 7,622,194 | B2* | 11/2009 | Ibuki ........................ | B32B 7/02 428/447 |
| 7,927,672 | B2* | 4/2011 | Ohtani ...................... | C08J 5/18 349/117 |
| 7,940,355 | B2* | 5/2011 | Sakarazawa ......... | C08K 5/0008 252/587 |
| 8,039,065 | B2* | 10/2011 | Ikeda ...................... | G02B 1/111 349/137 |
| 8,425,991 | B2* | 4/2013 | Nimura .................... | B29D 7/01 106/168.01 |

(Continued)

FOREIGN PATENT DOCUMENTS

| | | |
|---|---|---|
| JP | 8-43812 A | 2/1996 |
| JP | 2002-372621 A | 12/2002 |

*Primary Examiner* — Nicholas R Pasko
(74) *Attorney, Agent, or Firm* — Westerman, Hattori, Daniels & Adrian, LLP

(57) ABSTRACT

It is an object of the present invention to provide a polarizing plate which has high productivity and can suppress water-induced unevenness, and a method for producing the same. A polarizing plate includes: a retardation film provided on one surface of a polarizer with an adhesive layer interposed therebetween; and a protective film provided on the other surface of the polarizer with an adhesive layer interposed therebetween. The retardation film contains a cellulose resin. After the polarizing plate is immersed in water at 23° C. for 24 hours in a state where the polarizing plate is bonded to a glass plate, and taken out from the water, the polarizing plate has a dimensional change rate of 0.1% or less after 1 minute under an atmosphere of a temperature of 23° C. and humidity of 55%.

7 Claims, 1 Drawing Sheet

(56) References Cited

U.S. PATENT DOCUMENTS

| | | | | |
|---|---|---|---|---|
| 2006/0105155 | A1* | 5/2006 | Ikeyama | G02B 5/0226 428/220 |
| 2007/0064168 | A1* | 3/2007 | Shiraogawa | G02B 6/0056 349/56 |
| 2007/0092662 | A1* | 4/2007 | Matsuno | G02B 1/105 428/1.3 |
| 2008/0032067 | A1* | 2/2008 | Sakurazawa | C08J 5/18 428/1.5 |
| 2008/0062355 | A1* | 3/2008 | Sata | G02B 5/3083 349/96 |
| 2008/0085417 | A1* | 4/2008 | Takeko | B32B 7/12 428/441 |
| 2008/0143928 | A1* | 6/2008 | Fukagawa | B32B 17/10018 349/96 |
| 2009/0162577 | A1* | 6/2009 | Inoue | C09J 133/08 428/1.54 |

* cited by examiner

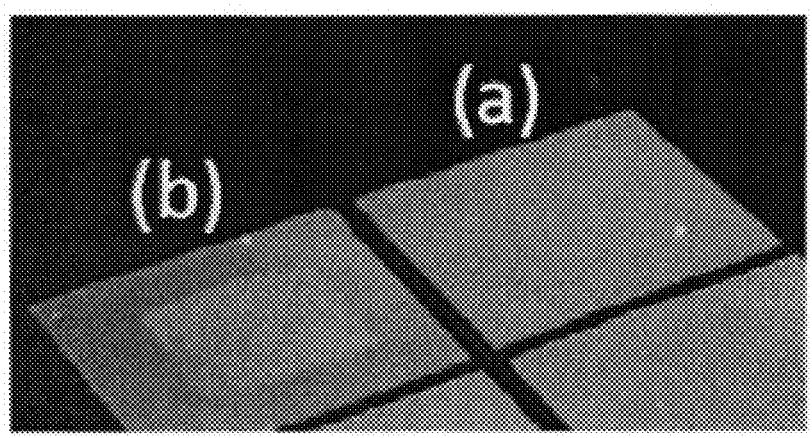

POLARIZING PLATE AND METHOD FOR MANUFACTURING POLARIZING PLATE

BACKGROUND OF THE INVENTION

Field of the Invention

The present invention relates to a polarizing plate and a method for manufacturing the polarizing plate.

Description of the Related Art

As a polarizing plate used for a liquid crystal display device or the like, a polarizer including protective films bonded to both surfaces thereof is generally used. Examples of the polarizer include a polarizer obtained by adsorbing a dichroic material such as iodine or a dichroic dye to a polyvinyl alcohol-based film and further orienting the film by stretching. From the viewpoint of a decrease in the thickness of the polarizing plate and a reduction in the number of members, or the like, a technique of bonding a retardation film containing a thermoplastic norbornene-based resin in place of one protective film has been proposed (see Patent Document 1).

The liquid crystal display device is often used for a long period of time wider a high temperature condition or the like because of the wide usage of the liquid crystal display device. For example, the liquid crystal display device is often used for vehicle installation and a handheld terminal. As a result, the polarizing plate is also required to have reliability (durability) such that the polarizing plate suffers from no deterioration in optical property when the polarizing plate is placed under a high temperature condition or high temperature/high humidity conditions.

However, since the triacetyl cellulose film used for the protective film is water-vapor permeable (has a high water-vapor permeability), the optical property of the polarizer and the adhesion property of an adhesive are deteriorated by the absorption of moisture, which may cause display unevenness. On the other hand, there has been proposed a technique of providing at least one resin layer between the polarizer and the protective film in the polarizing plate or on the surface of the polarizing plate to reduce a dimensional change rate under a heating humidification condition, thereby improving durability (Patent Document 2).

PRIOR ART DOCUMENTS

Patent Documents

Patent Document 1: JP-A-8-43812
Patent Document 2: JP-A-2002-372621

SUMMARY OF TEE INVENTION

The request of a reduction in production cost of a liquid crystal television or the like provides simple packing of constituent members during transportation. For example, a cell substrate and a polarizing plate which are bonded together in a so-called open cell state in place of independently vacuum-packing the cell substrate and the polarizing plate may be treated by simple packing. Since the simple packing is apt to cause dew condensation due to temperature change or the like during transportation, the phase difference of a portion of the polarizing plate directly brought into contact with water is changed, which disadvantageously causes display unevenness (hereinafter, also referred to as "water-induced unevenness").

In the technique described in Patent Document 2, the technique of reducing dimensional change under a heating humidification condition is disclosed. However, the technique does not improve water-induced unevenness caused by direct contact with water. In the technique described in Patent Document 1, the retardation film containing the thermoplastic norbornene-based resin has a low moisture permeability, which makes it necessary to dry an adhesive for adhesiveness between the polarizer and the retardation film for a prolonged time after bonding the polarizer and the retardation film together. This hinders an improvement in the productivity of the polarizing plate.

It is an object of the present invention to provide a polarizing plate which has high productivity and can suppress water-induced unevenness, and a method for producing the same.

As a result of earnest studies to solve the problems, the present inventors found a polarizing plate to be described below, and the present invention was accomplished.

That is, the present invention relates to a polarizing plate including:

a retardation film provided on one surface of a polarizer with an adhesive layer interposed therebetween; and a protective film provided on the other surface of the polarizer with an adhesive layer interposed therebetween, wherein the retardation film contains a cellulose resin; and the polarizing plate has a dimensional change rate of 0.1% or less after the polarizing plate is immersed in water at 23° C. for 24 hours in a state where the polarizing plate is bonded to a glass plate such that the retardation film is a bonding surface to the glass plate, the polarizing plate is taken out from, the water, and the polarizing plate is held for 1 minute under an atmosphere of a temperature of 23° C. and humidity of 55%.

After the polarizing plate is immersed in water at 23° C. for 24 hours in a state where the polarizing plate is bonded to the glass plate, the polarizing plate is taken out from the water, and the polarizing plate is held for 1 minute under an atmosphere of a temperature of 23° C. and humidity (relative humidity) of 55%, the polarizing plate has a dimensional change rate of 0.1% or less (hereinafter, merely also referred to as "an immersion dimensional change rate"), which can suppress the occurrence of water-induced unevenness. The dimensional change rate during contact with water is suppressed, which can suppress change in the optical characteristics of the polarizer even when dew condensation is caused by simple packing, and can also reduce the production cost of an image display device provided with the polarizing plate. The suppression of water-induced unevenness is a characteristic which is difficult to predict from a conventional heating humidification test. That is, even the polarizing plate satisfactorily evaluated in the heating humidification test does not always have an intended water-induced unevenness suppressing effect, and may cause display unevenness daring contact with water. The present invention focuses attention on the immersion dimensional change rate under a severer condition where the polarizing plate is immersed in water, and can prevent change in the optical characteristics of the polarizer to suppress display unevenness even when the polarizing plate is brought into contact with water.

The retardation film containing cellulose resin having a high moisture permeability is employed in the polarizing plate, which makes it unnecessary to perform a drying step for a prolonged time after bonding the polarizer and the retardation film together. As a result, the productivity of the polarizing plate can be improved.

In the polarizing plate, the protective film may contain a cellulose resin, or may contain a (meth)acrylic resin.

The present invention relates to a method for producing the polarizing plate, the method including the steps of:

bonding a retardation film to one surface of a polarizer with an adhesive layer interposed therebetween;

bonding a protective film to the other surface of the polarizer with an adhesive layer interposed therebetween; and leaving the polarizer with the retardation film and the protective film bonded to stand still at a temperature of 15° C. to 35° C. and a humidity of 40% to 65% for 50 days or more.

In the producing method, the polarizing plate which can suppress water-induced unevenness can be singly produced by merely providing a step of bonding a predetermined film to each of both the surfaces of the polarizer, and thereafter leaving the polarizer with the films bonded to stand still for 50 days or more at a temperature of 15° C. to 35° C. and a humidity of 40% to 65%, without performing a special step.

BRIEF DESCRIPTION OF THE DRAWING

FIG. 1 is a confirmation photograph for evaluation of display unevenness after water contact of Example 1 and Comparative Example 1.

DETAILED DESCRIPTION OF THE PREFERRED EMBODIMENTS

<Polarizing Plate>

A polarizing plate according to the present embodiment will be described. The polarizing plate according to the present embodiment includes a retardation film provided on one surface of a polarizer with an adhesive layer interposed therebetween, and a protective film provided on the other surface of the polarizer with an adhesive layer interposed therebetween.

(Polarizer)

It is preferable to use, as the polarizer, a polarizer including a polymer film on which iodine is adsorbed and oriented. The polymer film is not particularly limited, and various polymer films can be used. Examples of the polymer film include: hydrophilic polymer films such as a polyvinyl alcohol-based film, a polyethylene terephthalate-based film, an ethylene-vinyl acetate copolymer-based film, partially saponified films thereof, and a cellulose-based film; and polyene-based oriented films such as a dehydrated material of polyvinyl alcohol and a dehydrochlorinated material of polyvinyl chloride. Among these, a polyvinyl alcohol-based film having excellent stainability provided by iodine is preferably used as the polarizer.

Polyvinyl alcohol or a derivative thereof is used as a material of the polyvinyl alcohol-based film. Examples of the derivative of polyvinyl alcohol include polyvinyl formal and polyvinyl acetal as well as polyvinyl alcohol modified with an olefin such as ethylene or propylene, an unsaturated carboxylic acid such as acrylic acid, methacrylic acid, or crotonic acid, an alkyl ester thereof, or acryl amide.

The degree of polymerization of a polymer which is a material of the polymer film is generally 500 to 10,000, preferably 1,000 to 6,000, and more preferably 1,400 to 4,000. Furthermore, from the viewpoint of the solubility of a polymer, which is a material of a saponified film, in water, for example, the degree of saponification of the saponified film is preferably 75% by mole or more, more preferably 98% by mole or more, and still more preferably in the range of 98.3 to 99.8% by mole.

When the polyvinyl alcohol-based film is used as the polymer film, there can be appropriately used a polyvinyl alcohol-based film formed by any method such as a flow casting method for subjecting an undiluted solution dissolved in water or an organic solvent to flow casting to form a film, a casting method, or an extrusion method as a method for producing the polyvinyl alcohol-based film. A polyvinyl alcohol-based film having a retardation value of 5 nm to 100 nm is preferably used. In order to obtain a polarizer formed uniformly in plane, variation in the in-plane retardation of the polyvinyl alcohol-based film is preferably as small as possible. Variation in the in-plane retardation of the PVA-based film as an original fabric film is, at a measurement wavelength of 1000 nm, preferably 10 nm or less, and more preferably 5 nm or less.

The single transmittance of the polarizer in a wavelength range of 380 nm to 780 nm is preferably 44.5% or less, and more preferably 42 to 44%. When the single transmittance is more than 44.5%, the cross transmittance is increased to cause light leakage in black display, which is not preferable. When the polarizing plate according to the present embodiment is applied to a liquid crystal display device, the display contrast of a display screen can be further improved.

The polymer film (unstretched film) is subjected to at least a uniaxial stretching treatment and an iodine dyeing treatment according to conventional methods. The polymer film may further be subjected to a boric acid treatment or a cleaning treatment. The polymer film (stretched film) subjected to the treatment described above becomes a polarizer through drying according to a conventional method.

The stretching method in the uniaxial stretching treatment is not particularly limited, and either of a wet stretching method and a dry stretching method may be employed. Examples of a stretching means for the dry stretching method include a roll stretching method, a heating roll stretching method, and a compression stretching method. The stretching may be performed in a plurality of steps. In the stretching means, the unstretched film is generally in a heated state. The stretching ratio of the stretched film may be appropriately set according to the purpose. However, it is desirable that the stretching ratio (total stretching ratio) is about 2 to 8 times, preferably 3 to 6.5 times, and more preferably 3.5 to 6 times.

The iodine dyeing treatment is performed by immersing the polymer film in an iodine solution containing iodine and potassium iodide, for example. The iodine solution is generally an aqueous iodine solution, and contains iodine and potassium iodide as a dissolution aid. The concentration of iodine is about 0.01 to 1% by weight, and preferably 0.02 to 0.5% by weight. The concentration of potassium iodide is preferably about 0.01 to 10% by weight, and more preferably 0.02 to 8% by weight.

In the iodine dyeing treatment, the temperature of the iodine solution is generally about 20 to 50° C. and preferably 25 to 40° C. A time period of immersion is generally about 10 to 300 seconds, and preferably 20 to 240 seconds. In the iodine dyeing treatment, through adjustment of conditions such as the concentration of the iodine solution, and the temperature and time period of the immersion of the polymer film in the iodine solution, an iodine content and a potassium content in the polymer film are adjusted to be within the above range. The iodine dyeing treatment may be performed at any of the time points including before the uniaxial stretching treatment, during the uniaxial stretching treatment, and after the uniaxial stretching treatment.

The iodine content of the polarizer is, for example, 2 to 5% by weight, and preferably 2 to 4% by weight in view of optical property.

The polarizer preferably contains potassium. The potassium content is preferably 0.2 to 0.9% by weight, and more preferably 0.5 to 0.8% by weight. When the polarizer contains potassium, the polarizer having a preferable composite elastic modulus (Er) and a high degree of polarization can be obtained. The incorporation of potassium is enabled by immersing a polymer film which is a formation material of the polarizer in a solution containing potassium, for example. The solution may also serve as a solution containing iodine.

The thickness of the polarizer is not particularly limited, and generally 3 to 30 μm, preferably 5 to 30 μm.

(Retardation Film)

A retardation film preferably has a retardation satisfying at least one of a front retardation of 40 nm or more and a thickness direction retardation of 80 nm or more. The front retardation is generally controlled in the range of 40 to 200 nm, and the thickness direction retardation is generally controlled in the range of 80 to 300 nm. In the polarizing plate of this embodiment, the retardation plate also has the function of the protective film, and can therefore achieve a reduction in thickness.

The retardation film contains a cellulose resin. Examples of the film include a birefringent film produced by uniaxially or biaxially stretching a cellulose resin film.

Examples of the cellulose resin include cellulose resins such as hydroxyethyl cellulose, hydroxypropyl cellulose, and methylcellulose, various types of binary or ternary copolymers thereof, graft copolymers thereof, and any blend thereof. These cellulose resins are formed into an oriented product (stretched film) by stretching or the like.

The retardation film may be a retardation film having an appropriate retardation in accordance with a use purpose such as a purpose of compensation for coloration based on the birefringence of various wavelength plates or liquid crystal layers or for the viewing angle. The retardation film may be a laminate of two or more retardation films to control optical properties such as a retardation.

As the retardation film, films having adjusted various three-dimensional refractive indices can be used. Herein, for the three-dimensional refractive indices, a refractive index in an in-plane slow axis direction is defined as nx; a refractive index in an in-plane fast axis direction is defined as ny; and a refractive index in a thickness direction is defined as nz.

The three-dimensional refractive, indices can be appropriately adjusted by a method for molding a film and a processing method such as stretching. Examples of a retardation film containing the cellulose resin having variously controlled three-dimensional refractive indices include (i) a positive A plate having the relation of nx>ny≈nz, and (ii) a biaxial plate satisfying the relation of nx>ny>nz.

Note that "nx≈nz" and "ny≈nz" include not only a case where nx and nz or ny and nz are completely the same, but also a case where nx and nz or ny and nz are substantially the same. For example, "nx≈nz" includes also a case where (nx−nz)×d (d is a thickness of a film) is −10 nm to 10 nm, and preferably −5 nm to 5 nm, and "ny≈nz" includes also a case where (ny−nz)×d is −10 nm to 10 nm, and preferably −5 nm to 5 nm.

As (i) the positive A plate and (ii) the biaxial plate, a plate obtained by stretching a polymer having positive birefringence is generally used.

As used herein, the term "having positive birefringence" means that when a polymer is oriented by stretching or the like, the polymer has a relatively high refractive index in the orientation direction, and this may apply to many polymers. Examples of polymers having positive birefringence include fatty acid esters of cellulose such as triacetyl cellulose, diacetyl cellulose, tripropionyl cellulose, and dipropionyl cellulose, and cellulose resins such as cellulose ethers, which are described above. In particular, amorphous polymers having excellent heat resistance can be preferably used. These polymers may be used singly or in combination of two or more thereof.

The polymer film can be formed by, for example, an appropriate method such as a casting method or an extrusion method. The thickness of the film is generally 10 μm to 500 μm, preferably 20 μm to 300 μm, and still more preferably 40 μm to 200 μm.

The three-dimensional refractive index of the film used for the retardation film can be appropriately adjusted by the method for molding a film and the processing method such as stretching. The stretching method is not particularly limited when a phase difference is applied to the film, and a roll stretching machine and a tenter stretching machine are generally used. For example, (i) the positive A plate is obtained by subjecting a polymer film having positive birefringence to machine-direction uniaxial stretching by a roll stretching machine. (ii) The biaxial plate is obtained by subjecting a polymer film having positive birefringence to transverse stretching by a tenter stretching machine, or sequential or simultaneous biaxial stretching.

The surface of the retardation film opposite to the polarizer, i.e., the visually-recognized surface may be subjected to the formation of a hard coat layer, an anti-reflection treatment, an anti-sticking treatment, or a treatment for diffusion or anti-glare properties.

A hard coat treatment is applied fox the purpose of protecting the surface of an optical element from scratch. The hard coat treatment may be achieved by a method in which, for example, a curable coated film having excellent hardness and slide properties or the like is added on the surface of a film using appropriate ultraviolet-ray curing-type resins such as acrylic type and silicone type resins. The anti-reflection treatment is applied for the purpose of anti-reflection of outside light on the surface of a liquid crystal display device. The anti-reflection treatment may be achieved by forming an anti-reflection film or the like according to the conventional method.

The anti-glare treatment is applied in order to prevent a disadvantage that outside light reflects on the surface of the liquid crystal display device to disturb the visibility of display. The anti-glare treatment may be achieved, for example, by applying a fine concavo-convex structure to the surface of the film using, for example, an appropriate method such as a rough surfacing treatment method by sandblasting or embossing or a method of combining transparent fine particles.

The above-mentioned anti-reflection layer, anti-sticking layer, diffusion layer, and anti-glare layer or the like may be provided on the retardation film itself included in the optical element, and also they may be provided as an optical layer different from the retardation film.

(Protective Film)

The protective film has transparency to light. Thermoplastic resins having excellent transparency, mechanical strength, thermal stability, moisture interception property, isotropy and the like are used as materials which form the protective film. Specific examples of the thermoplastic resins include cellulose resins such as triacetylcellulose, a polyester resin, a polyethersulfone resin, a polysulfone resin, a polycarbonate resin, a polyamide resin, a polyimide resin, a polyolefin resin, a (meth)acrylic resin, a polyarylate resin, a polystyrene resin, a polyvinyl alcohol, resin, and mixtures thereof. A thermosetting resin or an ultraviolet-ray curing-type resin such as a (meth)acrylic, urethane, acrylic urethane, epoxy, or silicone resin can be used. The content of the thermoplastic resin in the protective film is preferably 50 to 100% by weight, more preferably 50 to 99% by weight, still more preferably 60 to 98% by weight, and particularly preferably 70 to 97% by weight. When the content of the thermoplastic resin in the protective film is less than 50% by weight, high transparency or the like inherently provided in the thermoplastic resin may fail to be sufficiently exhibited.

Examples of the protective film include a polymer film, described in JP-A-2001-343529 (WO 01/37007). The polymer film is made of a resin composition containing (A) a thermoplastic resin having a substituted and/or unsubstituted imido group in a side chain, and (B) a thermoplastic resin having substituted and/or unsubstituted phenyl and nitrile groups in a side chain. Specific examples include a film made of a resin composition containing an alternating copolymer made of isobutylene and N-methyl maleimide, and an acrylonitrile-styrene copolymer. A film made of an extruded article of a mixture of a resin composition or the like may be used. Since the films are smaller in retardation and smaller in photoelastic coefficient, defects such as unevenness due to a strain in the polarizing plate can be eliminated.

The thickness of the protective film can be appropriately set, and is generally about 1 to 500 µm from the viewpoint of strength, workability such as handleability, requirement for a thin film or the like. Particularly, the thickness is preferably 1 to 300 µm, and more preferably 5 to 200 µm. When the thickness is 5 to 150 µm, the protective film is particularly suitable.

At least one selected from a cellulose resin and a (meth)acrylic resin is preferably used for the protective film of the present embodiment.

Any suitable (meth)acrylic resin may be employed as long as the advantages of the present, invention are not reduced. Examples of the (meth)acrylic resin include poly (meth)acrylates such as poly(methyl methacrylate), a methyl methacrylate-(meth)acrylic acid copolymer, a methyl methacrylate-(meth)acrylate copolymer, a methyl methacrylate-acrylate-(meth)acrylic acid copolymer, a methyl (meth)acrylate-styrene copolymer (such as an MS resin), and alicyclic hydrocarbon group-containing polymers (such as a methyl methacrylate-cyclohexyl methacrylate copolymer and a methyl methacrylate-norbornyl (meth)acrylate copolymer). Preferable examples include poly (C1-6 alkyl(meth)acrylate)s such as poly(methyl(meth)acrylate). More preferable examples include a methyl methacrylate-based resin mainly containing methyl methacrylate (of 50 to 100% by weight, preferably 70 to 100% by weight).

Specific examples of the (meth)acrylic resin include Acrypet VH and Acrypet VRL20A each manufactured by Mitsubishi Rayon Co, Ltd., a (meth)acrylic resin having a ring structure in its molecule as described in JP-A-2004-70296, and a high-Tg (meth)acrylic resin produced by an intramolecular crosslinking or intramolecular cyclization reaction.

Lactone ring structure-containing (meth)acrylic resins can also be used as the (meth)acrylic resin. This is because the (meth)acrylic resins have high heat resistance and high transparency, and also have high mechanical strength after biaxially stretched.

Examples of the lactone ring structure-containing (meth)acrylic resins include lactone ring structure-containing (meth)acrylic reins described in JP-A-2000-230016, 2001-151814, 2002-120326, 2002-254544, 2005-146084 or the like.

The protective film preferably contains a (meth)acrylic resin having an unsaturated carboxylic acid alkyl ester unit and a glutarimide unit. The (meth)acrylic resin preferably has a structure unit including a glutarimide unit represented by the following general formula (1) and an unsaturated carboxylic acid alkyl ester unit represented by the following general formula (2).

[Formula 2]

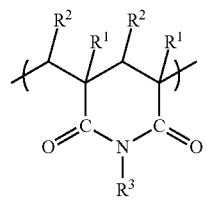

(1)

In the general formula (1), $R^1$ and $R^2$ each independently represent hydrogen or an alkyl group having 1 to 8 carbon atoms, and $R^3$ represents an alkyl group having 1 to 18 carbon atoms, a cycloalkyl group having 3 to 12 carbon atoms, or an aryl group having 6 to 10 carbon atoms.

[Formula 3]

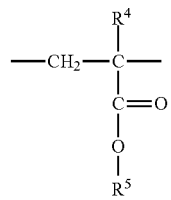

(2)

In the general formula (2), $R^4$ represents a hydrogen atom or an alkyl group having 1 to 5 carbon atoms. $R^5$ represents a hydrogen atom, or an aliphatic or alicyclic hydrocarbon group having 1 to 6 carbon atoms.

In the general formula (1), it is preferable that $R^1$ and $R^2$ each independently represent hydrogen or a methyl group, and $R^3$ is hydrogen, a methyl group, a butyl group, or a cyclohexyl group. It is more preferable that $R^1$ is a methyl group, $R^2$ is hydrogen, and $R^3$ is a methyl group.

The glutar(meth)acrylic resin may contain only a single glutarimide unit, or may contain a plurality of glutarimide units in which $R^1$, $R^2$, and $R^3$ in the general formula (1) are different.

The content by percentage of the glutarimide unit represented by the general formula (1) in the (meth)acrylic resin is preferably 5 to 50% by mole, more preferably 10 to 45% by mole, still more preferably 15 to 40% by mole, particularly preferably 20 to 35% by mole, and most preferably 25 to 35% by mole. When the content by percentage is less than 5% by mole, effects derived from the glutamic anhydride unit represented by the general formula (1), such as high optical property, high mechanical strength, adhesiveness with a polarizer, and a reduction in thickness may not be sufficiently exhibited. When the content by percentage is more than 50% by mole, for example, high heat resistance and high transparency may not be sufficiently exhibited.

The content by percentage of the unsaturated carboxylic acid alkyl ester unit represented by the general formula (2) in the (meth)acrylic resin is preferably 50 to 95% by mole, more preferably 55 to 90% by mole, still more preferably 60 to 85% by mole, particularly preferably 65 to 80% by mole, and most preferably 65 to 75% by mole. When the content by percentage is less than 50% by mole, effects derived from the unsaturated carboxylic acid alkyl ester unit represented by the general formula (2), such as high heat resistance and high transparency may not be sufficiently exhibited. When the content by percentage is more than 95% by mole, the resin is brittle so as to be easily cracked so that the resin cannot sufficiently exhibit high mechanical strength. Thus, the resin may be poor in productivity.

The (meth)acrylic resin having a glutarimide unit represented by the general formula (1) and an unsaturated carboxylic acid alkyl ester unit represented by the general formula (2) can be basically manufactured by the following method.

That is, the (meth)acrylic resin can be obtained by copolymerizing an unsaturated carboxylic acid alkyl ester monomer corresponding to the unsaturated carboxylic acid alkyl ester unit represented by the general formula (2) with an unsaturated carboxylic acid monomer and/or a precursor monomer thereof to obtain a copolymer (a), treating the copolymer (a) with an imidization agent to conduct an intramolecular imidization reaction between the unsaturated carboxylic acid alkyl ester monomer unit in the copolymer (a) and the unsaturated carboxylic acid monomer and/or the precursor monomer unit thereof, and then introducing the glutarimide unit represented by the general formula (1) into the copolymer.

Examples of the unsaturated carboxylic acid alkyl ester include methyl(meth)acrylate, ethyl(meth)acrylate, n-propyl (meth)acrylate, n-butyl(meth)acrylate, t-butyl(meth)acrylate, n-hexyl(meth)acrylate, cyclohexyl(meth)acrylate, chloromethyl(meth)acrylate, 2-chloroethyl(meth)acrylate, 2-hydroxyethyl(meth)acrylate, 3-hydroxypropyl (meth) acrylate, 2,3,4,5,6-pentahydroxyhexyl (meth)acrylate, and 2,3,4,5-tetrahydroxypentyl (meth)acrylate. These say be used alone or in combination of two or more thereof. Of these, methyl (meth)acrylate is more preferable and methyl methacrylate is particularly preferable since the compounds are excellent in thermal stability. That is, it is particularly preferable that in the general formula (1), $R^4$ is a methyl group and $R^5$ is a methyl group.

Examples of the unsaturated carboxylic acid monomer include acrylic acid, methacrylic acid, crotonic acid, α-substituted acrylic acid, and α-substituted methacrylic acid. Examples of the precursor monomer thereof include acryl amide and methacryl amide. The unsaturated carboxylic acid monomer or the precursor monomer thereof may be used alone or in combination of two or more thereof. Of these, it is particularly preferable that the unsaturated carboxylic acid monomer is acrylic acid and methacrylic acid, and the precursor monomer is acryl amide since the compounds cause the effects of the present invention to be sufficiently exhibited.

The method for treating the copolymer (a) with the imidization agent is not particularly limited, and any conventionally known methods can be used. For example, the copolymer (a) can be imidized by a method using an extruder, a batch type reaction vessel (pressure vessel) or the like. When the copolymer (a) is heat-melted using the extruder and treated with the imidization agent, the extruder to be used is not particularly limited, and various extruders can be used. Specifically, a single-screw extruder, a twin-screw extruder, a multi-screw extruder or the like can be used, for example. When the copolymer (a) is treated with the imidization agent using the batch type reaction vessel (pressure vessel), the structure of the batch type reaction vessel (pressure vessel) is not particularly limited.

The imidization agent is not particularly limited as long as the agent can generate the glutarimide unit represented by the general formula (1). Specific examples thereof include: aliphatic hydrocarbon group-containing amines such as methylamine, ethylamine, n-propylamine, i-propylamine, n-butylamine, i-butylamine, tert-butylamine, and n-hexylamine; aromatic hydrocarbon group-containing amines such as aniline, benzylamine, toluidine, and trichloroaniline; and alicyclic hydrocarbon group-containing amines such as cyclohexylamine.

It is also possible to use a urea compound, which generates the amines mentioned above upon being heated, such as urea, 1,3-dimethyl urea, 1,3-diethyl urea, and 1,3-dipropyl urea.

Among the imidization agents mentioned above, it is preferable to use methylamine, ammonia, and cyclohexylamine in view of the cost and physical properties, and it is particularly preferable to use methylamine.

In the imidization step, a ring-closing accelerator may be added if needed in addition to the imidization agent.

In the imidization step, the amount of the imidization agent is preferably 0.5 to 10 parts by weight, and more preferably 0.5 to 6 parts by weight based on 100 parts by weight of the copolymer (a). When the imidization agent is added in an amount of less than 0.5 part by weight, the imidization ratio of a resin composition to be finally obtained is decreased, which may cause remarkable deterioration in heat resistance thereof to induce appearance defects such as burnt deposit after the resin composition is molded. When the imidization agent is added in an amount of more than 10 parts by weight, the imidization agent remains in the resin, which may induce appearance defects such as burnt deposit after the resin composition is molded, and foaming.

The (meth)acrylic resin of the present embodiment contains the glutarimide unit represented by the general formula (1) and the unsaturated carboxylic acid alkyl ester unit, and has a specific imidization ratio, a specific acid value, and a specific acrylic ester unit content.

The imidization ratio in the (meth)acrylic resin is represented by the ratio between the glutarimide unit and the unsaturated carboxylic acid alkyl ester unit. Therefore, the "imidization ratio" refers to the proportion of the imide carbonyl groups in the whole carbonyl groups. The ratio can be measured by the NMR spectrum or IR spectrum of the (meth)acrylic resin, or other methods, for example. The imidization ratio in the present embodiment is obtained by subjecting a resin to $^1$H-MMR measurement using $^1$HNMR BRUKER AvanceIII (400 MHZ). When an area of a peak derived from the O—$CH_3$ proton of the unsaturated carboxylic acid alkyl ester near 3.5 to 3.8 ppm is defined as A, and an area of a peak derived from the N—$CH_3$ proton of guitar imide near 3.0 to 3.3 ppm is defined as B, the ratio is obtained according to the following formula.

$$Im\ \% = \{B/(A+B)\} \times 100$$

The imidization ratio is preferably 2.5 to 5.0%. An imidization ratio within the above range prevents deterioration in the heat resistance, transparency, molding processability, and mechanical strength of the (meth)acrylic resin to be obtained, and generation of burnt deposit when the (meth)acrylic resin is processed into the film. In contrast, an imidization ratio of less than 2.5% tends to cause burnt, deposit when the protective film is formed, insufficient heat resistance of the (meth)acrylic resin to be obtained, and impaired transparency. An imidization ratio of more than 5.0% also, tends to cause burnt deposit, unnecessarily high heat resistance and melt viscosity, deterioration in molding processability, extremely low mechanical strength during film processing, and impaired transparency.

The acid, value of the (meth)acrylic resin of the present embodiment represents the content of a carboxylic acid unit or a carboxylic anhydride unit in the (meth)acrylic resin. The acid value can be calculated by, for example, a titration method described in WO 2005-054311, or a titration method described in JP-A-2005-23272.

The acid value of the (meth)acrylic resin is preferably 0.10 to 0.50 mmol/g. An acid value within the above range can provide a (meth)acrylic resin having an excellent balance of heat resistance, mechanical properties, and molding processability. In contrast, for example, an acid value of more than 0.50 mmol/g tends to easily cause foaming of a resin when the resin is melted and extruded, deterioration in molding processability, and deterioration in productivity of a molded article. Ad acid value of less than 0.10 mmol/g makes it necessary to use a larger amount of a denaturating agent for adjusting the acid value. This may cause cost increase or induce generation of a gel-like material due to the residual denaturating agent, which is not preferable.

The amount of the acrylic ester unit contained in the (meth)acrylic resin of the present embodiment is preferably less than 1% by weight, and more preferably less than 0.5% by weight. An acrylic ester unit within the above range provides a (meth)acrylic resin having excellent thermal stability. An amount of more than 1% by weight tends to cause deterioration in thermal stability, and a decrease in the molecular weight and viscosity of a resin when the resin is manufactured or molded, to cause deterioration in physical properties.

The cellulose resin which can form the protective film is an ester of cellulose and a fatty acid. Specific examples of the cellulose ester resin include triacetyl cellulose, diacetyl cellulose, tripropyl cellulose, and dipropyl cellulose. Among these, triacetyl cellulose is particularly preferable. Many triacetyl cellulose products are commercially available and are advantageous in view of easy availability and cost. Examples of commercially available products of triacetyl cellulose include "UV-50," "UV-80," "SH-80," "TD60UL," "TD80UL," "TD-TAC," and "UZ-TAC" (trade names) manufactured by Fujifilm Corporation, and "KC series" manufactured by Konica Minolta. In general, these triacetyl cellulose products have a thickness direction retardation (Rth) of about 60 nm or less, while having an in-plane retardation (Re) of almost zero.

A cellulose resin film having a small thickness direction retardation is obtained by treating the cellulose resin, for example. Examples of the treating method include: a method which includes bonding a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for about 3 to 10 minutes), and then peeling the base film; and a method which includes coating a general cellulose resin film with a solution of a norbornene resin, a (meth)acrylic resin or the like in a solvent such as cyclopentanone or methyl ethyl ketone, drying the coating film by heating (for example, at 80 to 150° C. for about 3 to 10 minutes), and then peeling the coating film.

A fatty acid, cellulose resin film having a controlled degree, of fat substitution may foe used as the cellulose resin film having a small thickness direction retardation. While triacetyl cellulose for general use has a degree of acetic acid substitution of about 2.8, the degree of acetic acid substitution is preferably controlled to 1.8 to 2.7, and the degree of propion substitution is more preferably controlled to 0.1 to 1, so that the Rth can be reduced. The Rth may be controlled to be low by adding a plasticizer such as dibutyl phthalate, p-toluenesulfonanilide, or acetyl triethyl citrate, to the fatty acid-substituted cellulose resin. The plasticizer is preferably added in an amount, of 40 parts by weight or less, more preferably of 1 to 20 parts by weight, and still more preferably of 1 to 15 parts by weight, based on 100 parts by weight of the fatty acid cellulose resin.

The protective film may contain at least one type of any suitable additives. Examples of the additive include an ultraviolet-ray absorber, an antioxidant, a lubricant, a plasticizer, a release agent, an anti-discoloration agent, a flame retardant, a nucleating agent, an antistatic agent, a pigment, and a colorant.

A protective film having a front retardation of less than 40 nm and a thickness direction retardation of less than 80 nm is generally used. The front retardation Re is represented by the formula Re=(nx−ny)×d. The thickness direction retardation Rth is represented by the formula Rth=(nx−nz)×d. The Nz coefficient is represented by the formula Nz=nx−nz)/(nx−ny), where nx, ny and nz are respectively the refractive indices of the film in the directions of its slow axis, fast axis and thickness, and d is the thickness (nm) of the film. The direction of the slow axis is a direction in which the in-plane refractive index of the film is maximum. It is preferable that the protective film has as little coloring as possible. A protective film having a thickness direction retardation value of −90 nm to +75 nm is preferably used. Thus, coloring (optical coloring) of a polarizing plate resulting from a protective film can mostly be cancelled using the protective film having a thickness direction retardation value of −90 nm to +75 nm. The thickness direction retardation value (Rth) is more preferably −80 nm to +60 nm, and particularly preferably −70 nm to +45 nm.

The protective film may be subjected to a surface modification treatment before being coated with an adhesive. Specific examples thereof include a corona treatment, a plasma treatment, a primer treatment, and a saponification treatment. The surface of the protective film to which no polarizer is bonded may be subjected to the formation of a hard coat layer, an anti-reflection treatment, an anti-stick treatment, or a treatment for diffusion or antiglare properties.

(Adhesive Layer)

The adhesive layer used to bond the protective film to the polarizer is not particularly limited as long as the adhesive layer is optically transparent. The adhesive layer is of any type, such as a water-based adhesive layer, a solvent-based adhesive layer, a hot-melt adhesive layer, or a radical-curable adhesive layer. A water-based adhesive or a radical-curable adhesive is preferably used.

(Other Elements)

A pressure-sensitive layer may be provided for adhesion with other members such as a liquid crystal cell on the polarizing plate described above or an optical film on which at least one polarizing plate is laminated. A pressure-sensitive adhesive which forms the pressure-sensitive layer is not particularly limited. For example, an acryl-based polymer; a silicone-based polymer; polyester, polyurethane, polyamide, polyether; and fluorine-based and rubber-based polymers may be appropriately selected as a base polymer. Particularly, a pressure-sensitive adhesive such as an acryl-based pressure-sensitive adhesive may be preferably used, which has excellent optical transparency, exhibits pressure-sensitive characteristics such as moderate wettability, cohesiveness and adhesive property, and has excellent weather resistance, heat resistance and the like.

The polarizing plate according to the present embodiment can be preferably used for various image display devices such as a liquid crystal display device. When the polarizing plate according to the present embodiment is applied to the liquid crystal display device, the polarizing plate is disposed so that an optical transmission axis is orthogonal to the front surface and back surface of the liquid crystal cell. Thereby, light leakage in a wavelength range of visible light is reduced, to obtain a liquid crystal display device preventing the generation of discoloration in a display screen. The liquid crystal cell is not particularly limited, and, for example, any type of liquid crystal cell such as a TN type, STN type, π type, VA type or IPS type liquid crystal cell can be applied.

<Method for Producing Polarizing Plate>

The method for producing the polarizing plate according to the present, embodiment includes the steps of: bonding a retardation film to one surface of a polarizer with an adhesive layer interposed therebetween; bonding a protective film to the other surface of the polarizer with an adhesive layer interposed therebetween; and leaving the polarizing plate with the retardation film and the protective film bonded to stand still in an atmosphere of a temperature of 15° C. to 35° C. and humidity of 40% to 65% for 50 days or more.

The adhesive layer may be formed on one of or both the bonding surfaces of the polarizer and protective film. The adhesive layer may be formed on one of or both the bonding surfaces of the polarizer and retardation film. The forming method of the adhesive layer is not particularly limited, and for example, the forming method is preferably performed by the coating or dropping or the like of an adhesive composition.

The bonding method is not particularly limited, and examples thereof include a dry laminating method using a roll laminator.

The bonding temperature of the polarizer and protective film, and the bonding temperature of the polarizer and retardation film are preferably within the range of 15° C. to 30° C., and more preferably within the range of 20° C. to 25° C.

The polarizer to which the retardation film and the protective film are bonded is dried in order to evaporate moisture or solvent contained in the coated layer and cure the adhesive composition to form the adhesive layer when the adhesive composition is an aqueous or solvent type adhesive composition. The polarizer is dried in order to cure the adhesive composition to form the adhesive layer when the adhesive composition is a solventless type adhesive composition.

The drying may be performed at a constant temperature in a drier. The drying may be performed while a drying temperature is gradually changed at every predetermined time. Heat-treating means for drying is not particularly limited, and for example, methods using a hot plate, an oven, and a belt furnace or the like are appropriately employed. The drying may be performed by spraying hot wind with the methods.

After the retardation film and the protective film are bonded, the obtained polarizing plate (an original plate in the case of an elongated polarizing plate) is left to stand still at a temperature of 15° C. to 35° C. and a humidity of 40% to 65% for 50 days or more. The polarizing plate is preferably left to stand still for 90 days or more, and more preferably 120 days or more. Thereby, a polarizing plate which can suppress water-induced unevenness can be produced.

By performing the above steps, the polarizing plate according to the present embodiment can be produced.

EXAMPLES

Preferred examples of the present invention will be illustratively described in detail below. Unless otherwise stated, materials, contents and the like described in the examples are not intended to limit the scope of the invention in any way and are intended for illustration purposes only.

Example 1

(Polarizer)

A 45-μm-thick polyvinyl alcohol film having an average degree of polymerization of about 2,400 and a degree of saponification of 99.9% by mole or more ("VF-PS-A #4500" (trade name) manufactured by Kuraray Co., Ltd.) was let out from a roll, and immersed in warm water at 30° C. so that it was allowed to swell. The film was then immersed in an aqueous solution having an iodine/potassium iodide (weight ratio: 0.5/8) concentration of 0.3% by weight, and dyed while uniaxially stretched to 3.5 times in the MD direction. Furthermore, the film was immersed in an aqueous boric ester solution at 65° C., and uniaxially stretched in the MD direction to a total stretch ratio of 6 times in the aqueous boric ester solution. After the stretching, the film was dried in an oven at 40° C. for 3 minutes to produce a polarizer (thickness: 17 μm, moisture percentage: 25% by weight, potassium content: 0.78% by weight, single transmittance: 42.7%).

(Protective Film)

A triacetyl cellulose film having a thickness of 60 μm and a water-vapor permeability of 500 g/m²·day ("TD69UL" manufactured by Fuji Photo Film Co., Ltd.) was used as a protective film.

(Retardation Film)

As the retardation film, a triacetylcellulose-based retardation film having a thickness of 60 μm, an in-plane retardation Re (550 nm) 55 nm, and a thickness direction retardation Rth (550 nm) 120 nm ("WVBZ4A6" manufactured by Fujifilm Corporation) was used.

(Preparation of Adhesive)

Into pure water (water temperature: 30° C.) were dissolved 100 parts by weight of a polyvinyl alcohol-based resin having an acetoacetyl group (average degree of polymerization: 1,200, degree of saponification: 98.5%, degree of acetoacetylation: 5% by mole) and 50 parts by weight of methylol melamine to produce an aqueous solution having a solid content concentration of 3.7% by weight. To 100 parts by weight of the resultant, aqueous solution, 18 parts by weight of an aqueous alumina colloid solution (average particle diameter: 15 nm, solid content concentration: 10% by weight, positive charge) was added to prepare an aqueous adhesive composition solution. The viscosity of the aqueous adhesive composition solution measured using Rheometer:

RS-1 (manufactured by Heake) was 9.6 mPa·s. The pH of the aqueous adhesive composition solution was 4 to 4.5.
<Production of Polarizing Plate>

The retardation film was coated with the aqueous adhesive composition solution so that the thickness after drying was set to 80 nm, to form an adhesive layer. The coating was performed at 23° C. after 30 minutes from the preparation of the aqueous adhesive composition solution. The protective film was similarly coated with the aqueous adhesive composition solution, to form an adhesive layer.

Next, by using a laminating machine, the protective film was bonded to the surface of the polarizer with the adhesive layer interposed therebetween, and the retardation film was bonded to the back face of the polarizer with the adhesive layer interposed therebetween. The bonding temperature was set to 23° C. Then, the polarizer after the protective film and the retardation film were bonded was dried. In the dry condition, a drying temperature was set to 85° C. (constant), and a drying time was set to 10 minutes.

After drying, the polarizer was left to stand still for 180 days under an environment of a temperature of 23° C. and humidity of 55% to produce a polarizing plate according to the present Example.

Example 2

A polarizing plate was produced in the same manner as in Example 1 except that a total stretch ratio when a polarizer was produced was set to 6 times; the thickness of the polarizer was set to 23 µm; and the polarizer was left to stand still for 120 days.

Example 3

A polarizing plate was produced in the same manner as in Example 1 except that a triacetylcellulose film having a thickness of 60 µm and a moisture permeability of 550 g/m²·day ("KC6UA" manufactured by KONICA MINOLTA, INC.) was used as a protective film; a triacetylcellulose-based retardation film having a thickness of 40 µm, an in-plane retardation Re (550 nm) 55 nm, and a thickness direction retardation Rth (550 nm) 130 nm ("KC4CR" manufactured by KONICA MINOLTA, INC.) was used as a retardation film; and a polarizer was left to stand still for 90 days.

Example 4

(Protective Film)

An MS resin (MS-200; copolymer of methyl methacrylate/styrene (molar ratio) of 80/20, manufactured by Nippon Steel Chemical Co., Ltd.) was imidized with monomethylamine (imidization ratio: 5%). The obtained imidized MS resin had a glutarimide unit represented by the general formula (1) wherein $R^1$ and $R^3$ represent a methyl group and $R^2$ represents a hydrogen atom), a (meth)acrylic ester unit represented by the general formula (2) ($R^4$ and $R^5$ represent a methyl group), and a styrene unit. An intermeshing co-rotating type twin-screw extruder having a bore diameter of 15 mm was used for imidization. The temperature of temperature control zones of the extruder was set to 230° C. The screw rotation speed was set to 150 rpm. The MS resin was fed to the extruder at a feed rate of 2.0 kg/hr. The amount of monomethylamine fed was 2 parts by weight relative to the MS resin. The MS resin was fed through a hopper of the extruder, and was melted in a kneading block of the extruder such that the kneading block was sufficiently charged with the resin thus melted. Thereafter, monomethylamine was injected through a nozzle of the extruder. A seal ring was placed in an end of the reaction zone such that the reaction zone was sufficiently charged with the resin. After the reaction, a by-product and an excess of methylamine were volatilized while the pressure exerted on a vent of the extruder was reduced to −0.08 MPa. The resin was extruded in a strand form through a die provided at an exit of the extruder. The resin thus extruded was cooled down in a water tank, and then was pelletized by a pelletizer. The imidized MS resin was melted and extruded to form a film. Then, the film was biaxially stretched to 2 times in a longitudinal direction and 2 times in a lateral direction to produce an acrylic resin film containing a glutarimide unit (thickness: 40 µm, Re: 2 nm, Rth: 2 nm, water-vapor permeability: 60 g/m²·day).

A polarizing plate was produced in the same manner as in Example 1 except that the acrylic resin film produced above was used as a protective film; and a polarizer was left to stand still for 100 days.

Comparative Example 1

A polarizing plate was produced in the same manner as in Example 1 except that a polarizer was left to stand still for 20 days.

Comparative Example 2

A polarizing plate was produced in the same manner as in Example 4 except that a polarizer was left to stand still for 10 days.
<Evaluation>

The polarizing plates of Examples and Comparative Examples after being left to stand still were evaluated as follows. The evaluation results are shown in Table 1.
<<Evaluation of Dimensional Change Rate of Polarizing Plate after being Immersed in Water>>

A polarizing plate having an absorption axis of 0 degree was cut in a square shape of 10 cm×10 cm. The cut polarizing plate was bonded to a 0.7-mm-thick glass plate (manufactured by Hiraoka Special Glass Mfg. Co., Ltd.) with an acrylic adhesive interposed therebetween such that the retardation film side was a bonding surface to the glass plate. Then, the polarizing plate with the glass plate was left to stand still at normal temperature for 1 day, to dry the adhesive, thereby producing a glass laminated product. The size D0 of the polarizing plate at this time was measured. After drying, the glass laminated product was immersed in water at 23° C. for 24 hours, and the glass laminated product was then taken out from the water. The glass laminated product was placed under a normal temperature-normal humidity atmosphere (temperature: 23° C., humidity: 55%), and the size D1 of the polarizing plate after 1 minute from the taking-out of the glass laminated product was measured. From the size D0 of the polarizing plate before water immersing, and the size D1 of the polarizing plate after water immersing, the dimensional change rate (%) was calculated based on the following formula. The size of the polarizing plate was taken as the size of the polarizing plate in the TD direction (the direction perpendicular to the absorption axis of the polarizing plate).

Immersion TD dimensional change rate (%)= $\{(D1_{TD}-D0_{TD})/D0_{TD}\}\times 100$ <<Evaluation of Display Unevenness by Contact with Water>>

The polarizing plate cut in a 10-cm square was bonded onto a liquid crystal, panel ("TL-50UD90" manufactured by CHIMEI Corporation) such that the protective film side was a bonding surface to the liquid crystal panel. A gauze (5 cm×5 cm) into which water was infiltrated was set on the central part of the surface of the polarizing plate, and was left to stand still at 23° C. for 24 hours. While the gauze was left to stand still, water was continuously supplied to the gauze so that the gauze was not dried without turning on a back light. The gauze was removed after 24 hours, and moisture on the surface of the polarizing plate was lightly wiped off. Then, the back light was turned on to visually evaluate display unevenness. A case where the display unevenness was not confirmed was evaluated as "O", and a case where the display unevenness was confirmed was evaluated as "x". Confirmation photographs for evaluating the display unevenness after water contact of Example 1 (FIG. 1A) and Comparative Example 1 (FIG. 1B) are shown in FIG. 1.

<<Evaluation of Dimensional Change Rate of Polarizing Plate During Humiaifying>>

The polarizing plate (absorption axis: 0 degree) was cut in a square of 10 cm×10 cm, left to stand still under a condition of 23° C. and 65% RH for 48 hours, and then left to stand still under a humidifying condition of 60° C. and 90% RH for 120 hours. The sizes of the polarizing plate in the direction of the absorption axis after and before humidifying (before humidifying: d0; after humidifying: d1) were measured, and the humidifying dimensional change rate was calculated from the following formula. The size of the polarizing plate was taken as the size of the polarizing plate in the TD direction.

Humidifying TD dimensional change rate (%)={(D1$_{TD}$-D0$_{TD}$)/DO$_{TD}$}×100

A constant tendency in both Example and Comparative Example was not observed. Thereby, the water-induced unevenness suppressing effect of the present invention is first found under a severe condition of immersion in water.

What is claimed is:

1. A method for producing a polarizing plate comprising steps of:
   bonding a retardation film to one surface of a polarizer with an adhesive layer interposed therebetween;
   bonding a protective film to the other surface of the polarizer with an adhesive layer interposed therebetween;
   leaving the polarizer with the retardation film and the protective film bonded to stand still at a temperature of 15° C. to 35° C. and a humidity of 45% to 65% for 50 days or more.

2. A polarizing plate made by the method according to claim 1, the polarizing plate comprising:
   a retardation film provided on one surface of a polarizer with an adhesive layer interposed therebetween; and
   a protective film provided on the other surface of the polarizer with a second adhesive layer interposed therebetween,
   wherein the retardation film contains a cellulose resin, and
   wherein the polarizing plate after water immersion has a dimensional change rate of 0.1% or less.

3. The polarizing plate according to claim 2, wherein the protective film contains a cellulose resin.

4. The polarizing plate according to claim 2, wherein the protective film contains a (meth)acrylic resin.

5. The polarizing plate according to claim 2, wherein the polarizer has a single transmittance of 42% to 44.5% at a wavelength of 380 nm to 780 nm.

TABLE 1

| | Protective film | Retardation film | Thickness of polarizer (μm) | The number of days for being left to stand still after bonding | TD dimensional change rate after water immersion (%) | Display unevenness test | TD dimensional change rate during humidifying (%) |
|---|---|---|---|---|---|---|---|
| Example 1 | TD60UL | WVBZ4A6 | 17 | 180 | 0.06 | o | −0.08 |
| Example 2 | TD60UL | WVBZ4A6 | 23 | 120 | 0.07 | o | −0.15 |
| Example 3 | KC6UA | KC4CR | 17 | 90 | 0.08 | o | −0.08 |
| Example 4 | Acrylic | WVBZ4A6 | 17 | 100 | 0.07 | o | −0.11 |
| Comparative Example 1 | TD60UL | WVBZ4A6 | 17 | 20 | 0.12 | x | −0.08 |
| Comparative Example 2 | Acrylic | WVBZ4A6 | 17 | 10 | 0.12 | x | −0.11 |

(Results)

As is apparent from Table 1, in the polarizing plates according to Examples 1 to 4, the dimensional change rate after water immersion was reduced, and the display unevenness caused by contact with water was also suppressed. In Comparative Examples 1 and 2, the dimensional change rate after water immersion was increased, and the display unevenness caused by contact with water was confirmed. This is found from no blank display unevenness in Example 1, by contrast, blank display unevenness in Comparative Example 1 in the confirmation photograph of FIG. 1. The dimensional change rates during humidifying had a problem-free level in both Example and Comparative Example.

6. The polarizing plate according to claim 2, wherein the retardation film has an in-plane retardation of 40 nm to 200 nm and a thickness direction retardation of 80 nm to 300 nm.

7. The polarizing plate according to claim 2, wherein the retardation film is selected from the group consisting of a positive A plate having the relation of nx>ny≈nz and a biaxial plate satisfying the relation of nx>ny>nz;
   wherein nx is a refractive index in an in-plane slow axis direction
   wherein ny is a refractive index in an in-plane fast axis direction; and
   wherein nz is a refractive index in a thickness direction.

* * * * *